March 14, 1967     H. L. ARROWOOD     3,309,130
REVERSIBLE TUBING ELEVATOR
Filed Feb. 19, 1965     4 Sheets-Sheet 1

INVENTOR.
HUBERT L. ARROWOOD
BY Head & Johnson
ATTORNEYS

INVENTOR.
HUBERT L. ARROWOOD

BY Head & Johnson

ATTORNEYS

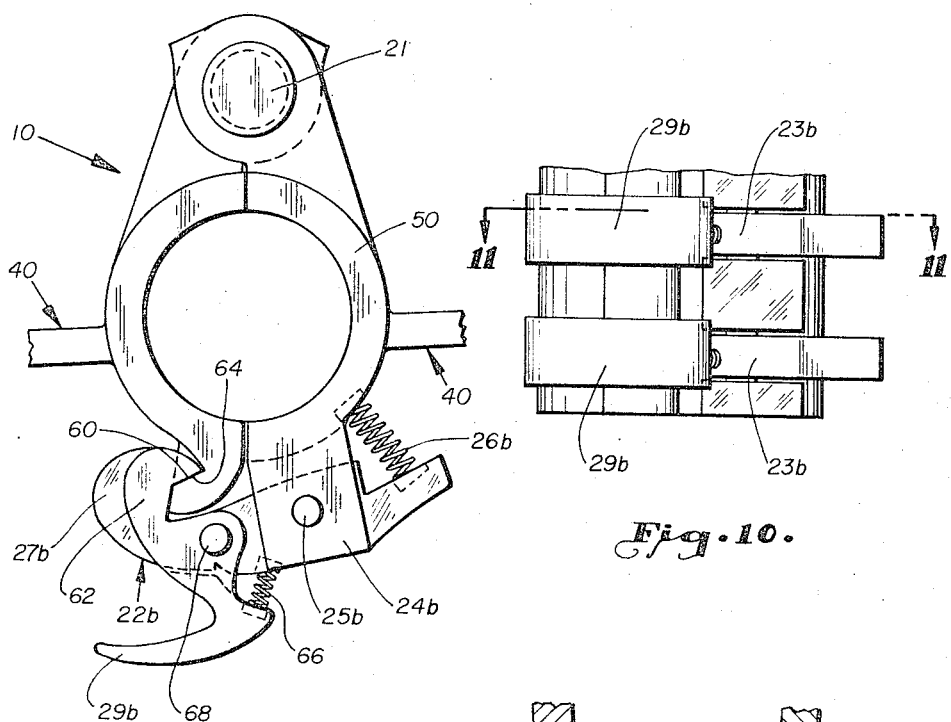
Fig. 9.
Fig. 10.
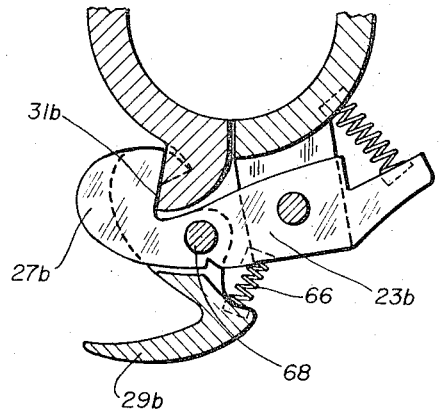
Fig. 11.
INVENTOR.
HUBERT L. ARROWOOD
BY Head & Johnson
ATTORNEYS

United States Patent Office 3,309,130
Patented Mar. 14, 1967

3,309,130
REVERSIBLE TUBING ELEVATOR
Hubert L. Arrowood, 3731 E. Virgin St.,
Tulsa, Okla. 74115
Filed Feb. 19, 1965, Ser. No. 434,042
2 Claims. (Cl. 294—90)

This invention relates to tubing elevators, and particularly to an improved reversible form of elevator.

Tubing elevators are commonly employed for running pipe, commonly tubing strings, in and out of wells such as oil and gas wells, the elevators being employed to form a supporting connection between the pipe and hoisting equipment by which the pipe is run.

Conventional elevators ordinarily are so designed that they can be employed only with one size pipe. Moreover, if the pipe is of the externally upset type, a different elevator must be employed than the one which can be used for standard diameter pipe without the external upset. Furthermore, with most such elevators the upper end of the body is employed to engage beneath the edge of the collar or coupling attached to the pipe to support the load of the pipe. In conventional elevators the body is so shaped or constructed that only one end of the body may be employed for this purpose.

A primary object of the present invention is to provide a form of tubing elevator which is capable of handling pipe which may be either uniform in external diameter or of the externally upset type, having a larger diameter portion adjacent the ends of the pipe section.

An important object is to provide a tubing elevator which is symmetrical in its construction so that it may be turned end-for-end and either end may be used to support the tubing string.

A further object is to provide a tubing elevator having an axial bore of two different diameter dimensions, the larger diameter being adapted to accommodate the externally upset portion of a pipe joint, and the smaller diameter to accommodate the nominal external diameter of the pipe joint.

A further object is to provide a split-type tubing elevator having double latches extending in opposite directions between the elevator segments to more effectively secure the segments together when closed about the tubing.

A more specific object is to provide a split-type tubing elevator comprising two generally semi-circular segments hinged together along one side for opening and closing about a pipe string and employing a floating-type hinge pin whereby to reduce the friction and wear under load in the hinge elements.

Still another object is to provide a split-type hinged tubing elevator employing an improved form of latch structure which assures greater safety when in use.

Another object is to provide a split-type hinged tubing elevator embodying multiple-action safety catches to protect against accidental opening in use and thus provide greater safety.

Other and more specific objects and advantages of this invention will become apparent from the following detailed description when read in connection with the accompanying drawings which illustrate useful embodiments in accordance with this invention.

In the drawing:

FIGURE 9 is a partial top plan view of a second modification of the tubing elevator;

FIGURE 10 is a partial side elevational view of the modified tubing elevator of FIGURE 9; and FIGURE 11 is a partial sectional view of the tubing elevator of FIGURE 10 through the section 11—11.

Figure 4:
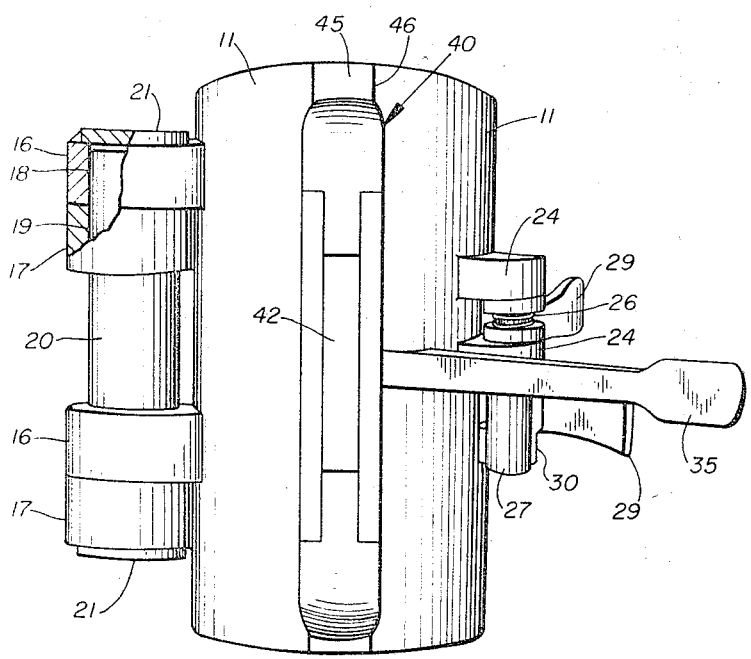
FIGURE 4 is a side elevational view, in perspective, of the elevator in closed position having a portion thereof broken away.

Referring to the drawings, the elevator comprises a generally tubular body, designated generally by the numeral 10, comprising two generally semi-circular segments 11—11 of generally identical construction and generally symmetrical with respect to a central transverse plane. The segments when closed define an axial bore comprising a larger diameter portion 12 and a smaller diameter portion 13 of approximately equal length, the difference in diameters defining an annular shoulder 15 at substantially the mid-point between the ends of the body. The body segments are hingedly connected together. One of the body segments carries a pair of outwardly projecting flat hinge rings 16—16 disposed in end-abutting relation to similar hinge rings 17—17 mounted on the other body segment, the respective hinge rings having registering bores 18 and 19, respectively (FIGURE 4) for the reception of a cylindrical hinge pin 20 which is dimensioned to float in the registering bores and is maintained in place in the bores by means of end-caps 21—21 welded to the outer ends of the outermost hinge rings 16 and 17. By this arrangement employing the floating hinge pin, it will be seen that when the body segments are rotated, the hinge pin will be free to rotate, so that binding or excessive friction between the pin and the hinge rings will be obviated and wear on the hinge pin thereby greatly reduced, as compared with more conventional arrangements in which the hinge pin is fixedly secured to one of the pairs of hinge rings.

Each of the body segments is provided on the front portion (the hinge connection being considered the back of the body) with a pivoted spring latch, designated generally by the numeral 22, the latches projecting in opposite directions toward the opposed body segments. Each of the latches comprises an elongated body 23, or arm, pivoted at one end between a pair of pivot lugs 24—24 mounted on the respective body segments by means of a vertically positioned pivot pin 25, to swing in a horizontal plane. A coil spring 26 is mounted about the pivot pin to resiliently bias the free end of the latch inwardly toward the opposite body segment. The free end of the latch is provided with a nose 27 which extends substantially at right angles to the latch body 23 and generally parallel to the exterior of the elevator body. The rearward face of nose 27 defines a vertical flat latching surface 28, while the forward face 34 of nose 27 is elliptically curved in horizontal section. A hand or finger grip 29 projects forwardly from the outer face of latch body 23 by which an operator may pull the latch 22 outwardly against the resistance of spring 26. The opposite body segment carries a latching lug 30 having a flat latching face 31 on the side remote from the opposed body segment carrying the related latch. The forward face of lug 30 is shaped to define a curved surface 32 which curves rearwardly from latching face 31 and downwardly into the outer surface of the body segment and is adapted to be engaged by curved surface 34 of the nose 27 of the related latch. Each of the body segments is provided with a handle 35 by which the segments may be swung toward and away from each other. It will be seen that when the segments are moved toward each other the curved surfaces 34 of the nose portions 27 of each of the latches 22 will ride over surfaces 32 of the related latch lugs 30 and latching faces 28 of the latches will slide over and engage against latching faces 31 of the latch lugs, thus effectively locking the body segments together. By making faces 28 and 31 flat, as shown, they will resist separation due to the radial pressure on the body segments, but may be easily separated by radial movement effected by pulling outwardly on the hand grips 29, which will release the latches from the latch lugs. The latches 22 are positioned on the body segments in closely adjacent relation, located substantially equidistantly from the ends of the body.

Figure 1:
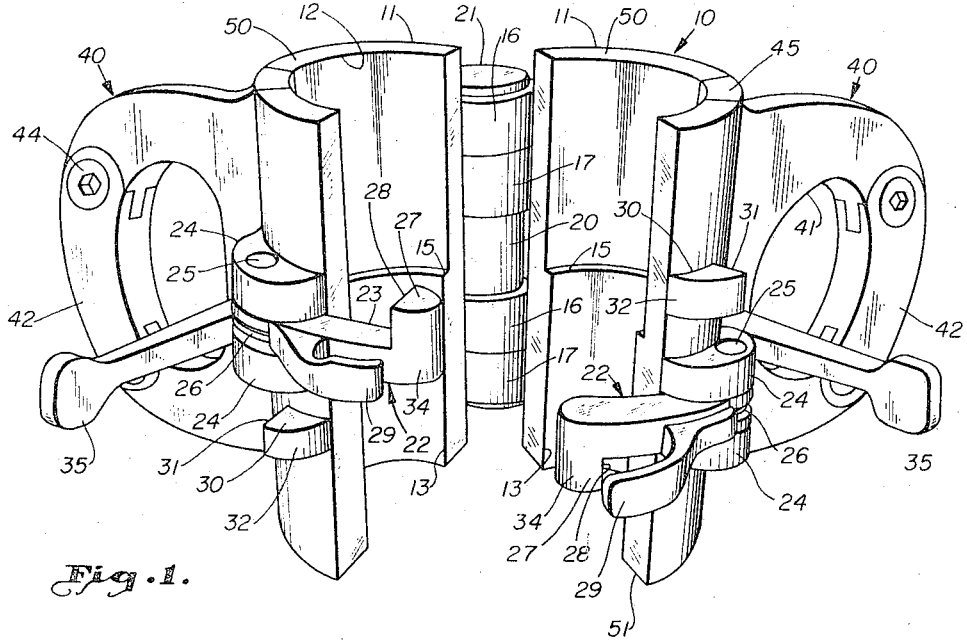
FIGURE 1 is an elevational view, in perspective, of a tubing elevator in accordance with the present invention shown in open position.
Figure 2:
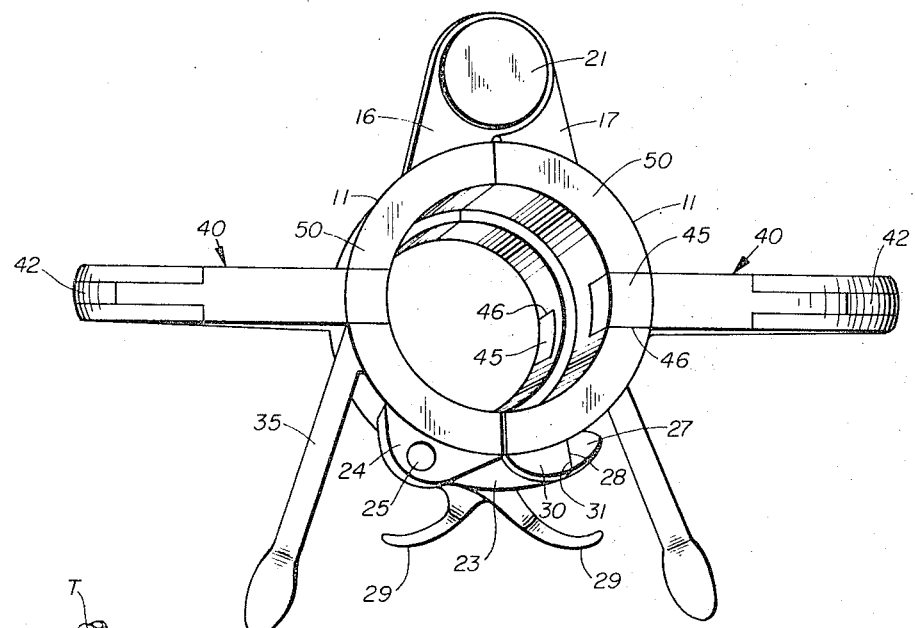
FIGURE 2 is a top plan view, in perspective, of the elevator shown in the closed position.
Figure 5:
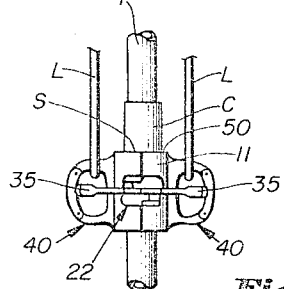
FIGURE 5 is a view showing the elevator in operating position about the pipe string.
Figure 3:
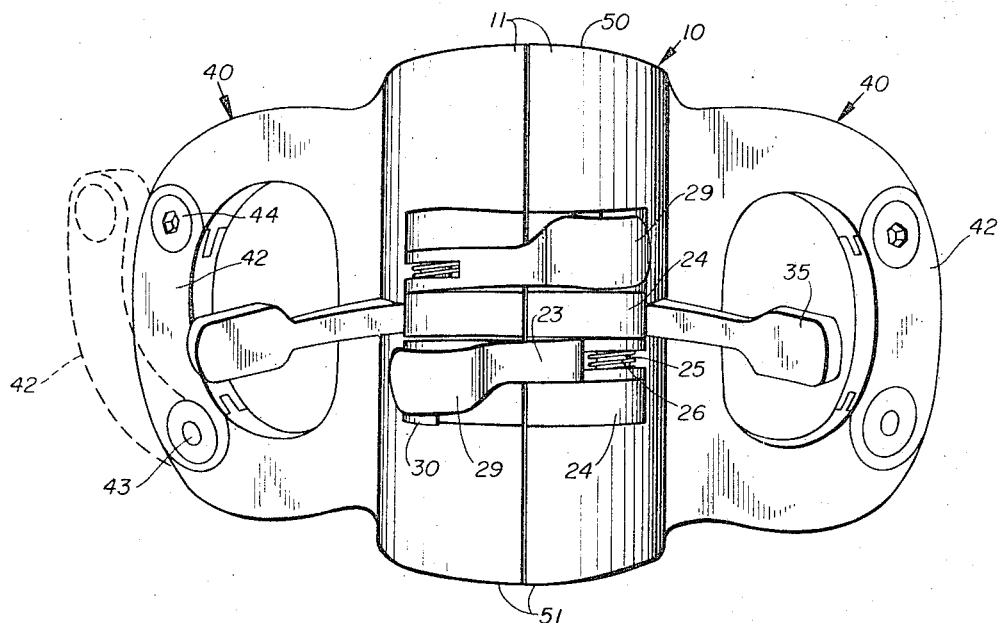
FIGURE 3 is a front elevational view, in perspective, of the elevator shown in closed position.

Each of the body segments has rigidly secured thereto a hoisting ear, designated generally by the numeral 40, which is mounted longitudinally along the middle of the body segment to extend radially outwardly therefrom. Hoisting ears 40 are generally oval in shape, having a generally central opening 41 to receive the conventional elevator links L (FIGURE 5) by which the elevator is connected to the traveling block or hoisting hook of a derrick or the like. Each of the ears 40 is provided with a hinged gate 42 which forms a segment of the outer portion of the ear. The gate 42 is hinged at one end to the ear by means of a hinge pin 43 and is separably connected at the other end by means of a removable bolt 44. In use, the bolt 44 may be removed and the gate swung outwardly, as indicated in broken lines in FIGURE 3, to admit the elevator link L, whereupon the gate may be closed and bolt 44 reinserted to close the gate and thus secure the link in the ear. Each of the ears is preformed to provide integral extensions 45 from the inner sides thereof, the extensions being receivable in correspondingly shaped slots 46 extending longitudinally from the opposite ends of the body segments for a distance equal to the length of the projections. These projections are welded to the body segments along the inserted edges and thus the connections between the ears and the body are greatly strengthened, both by the welding connection and by the load-bearing support afforded by the engagement of the projections with the opposite ends of the body segments. The ends of the body segments define flat surfaces, the outer ends defining the larger bore diameter 12, being the surfaces 50—50, and those defining the smaller bore diameter 13 being the surfaces 51—51. These flat end faces or surfaces constitute the load-bearing surfaces of the elevator, being adapted to engage beneath the annular shoulders formed by the pipe collars normally mounted on the string of pipe or on the individual pipe sections being handled by the elevators.

Figure 7:
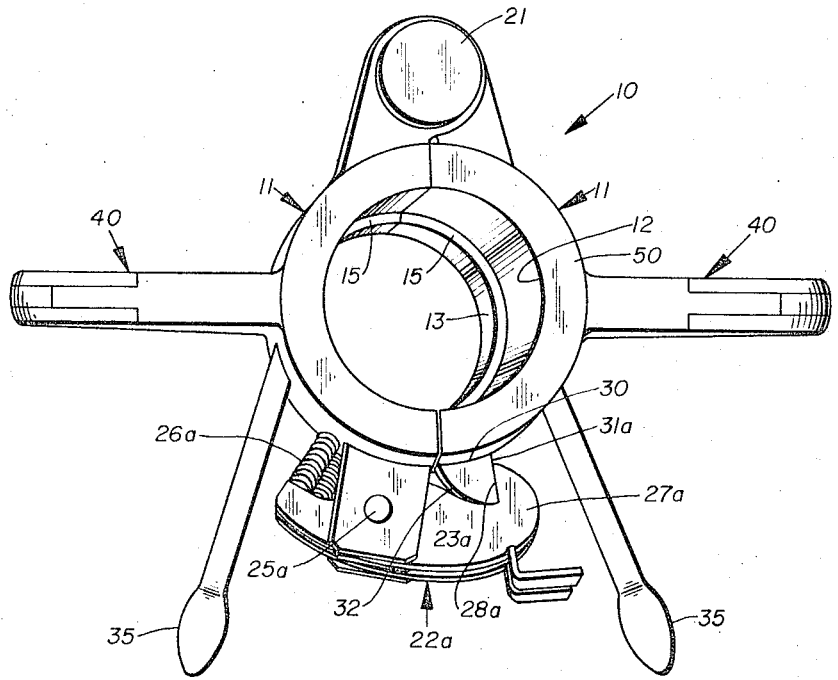
FIGURE 7 is a top plan view in perspective of a modified form of elevator having both latches on the same body segment, and with the elevator in closed position.
Figure 8:
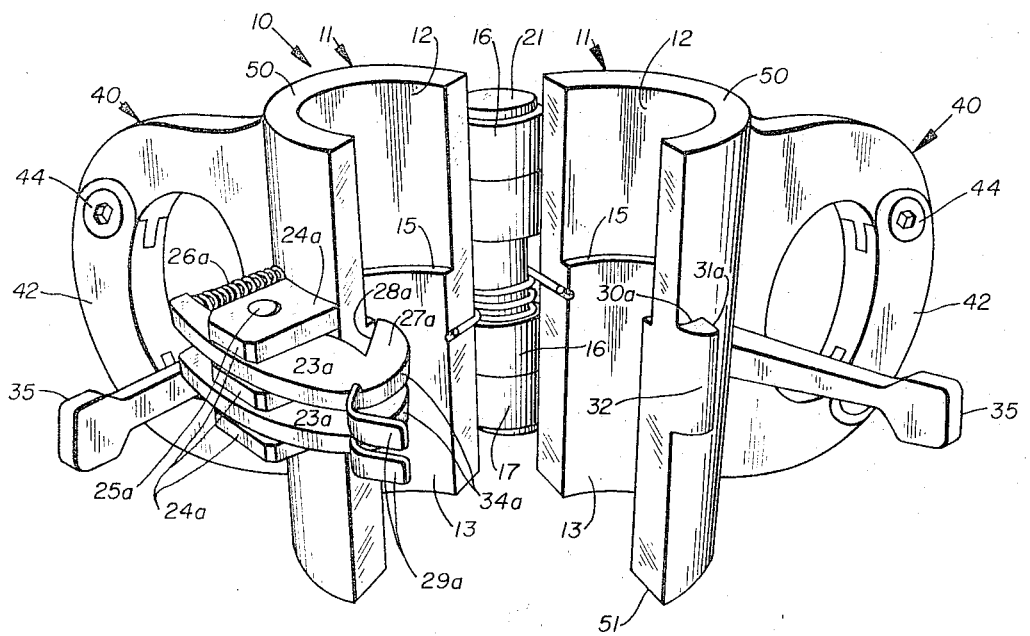
FIGURE 8 is a perspective view of the modified form of elevator in open position.

FIGURES 7 and 8 show a modified form of the elevator in which the two pivoted spring latches 22a are positioned on the same body segment and project in the same direction. The use of two latches instead of one provides a measure of security for the latch since, if one latch should slip or fail to hold, the other latch may still retain the elevator in its closed position. The elongated bodies 23a of the two latches are pivoted near their centers between the three pivot lugs 24a by means of the pivot pin 25a. A coil spring 26a is mounted horizontally between the body segment and the rearward extension of each latch body 23a in a manner to bias the nose portion 27a of the latches inwardly toward the body segment. The rearward face of the nose 27a of each latch defines a vertical flat latching surface 28a, while the forward face 34a is elliptically curved in horizontal section. Each latch includes a finger grip 29a. The opposite body segment includes a single latching lug 30a having a flat latching face 31a on the side remote from the two latches. The curved surface 32 of the latching lug 30a is adapted to be engaged by the curved surface 34a of each of the nose portions 27a of the latches.

Another modified form of the tubing elevator is disclosed in FIGURES 9, 10 and 11. In these figures, for simplicity in picturing the modification, the hoisting ears 40 are not fully shown. In this modification a pair of safety catches 62 is included in addition to the pair of spring latches 22b. In this modified version the finger grips 29b are not an integral part of the latch bodies, but have been made separate elements and are constructed to include the safety catches 62. The finger grips 29b are pivotally connected to the latch bodies 23b by means of the finger grip pins 68. As may readily be seen from FIGURES 9–11, the safety catch 62 extends integrally horizontally from the uppermost portion of the finger grip 29b. FIGURE 11 shows that the nose portion 27b of the spring latch 22b presents a flat face against the flat latching face 31b. Upwardly adjacent face 31b the tubing hanger has been provided with a further slight indentation to provide safety catch face 60 against which the safety catch latching surface 64 will abut. When the elevator is closed the safety catch surface 64 will be held against the safety catch face 60 by the biasing action of the finger grip spring 66. Similarly to the other modifications previously described the spring latch 22b is held in position in the pivot lug 24b by the pivot pin 25b and is biased toward a normally closed position by the action of the coil spring 26b.

It can readily be seen that when the tubing elevator is in a closed position, the latch will not open if pressure is exerted against the latch body in the direction of the elevator and at a point on the latch body directly opposite the coil spring 26b. When such pressure is applied, the safety catch latching surface 64 will be forced more tightly against the catch face 60.

Thus, in opening the latch, a pull on the finger grip 29b will cause that grip to rotate around the finger grip pin 68 against the biasing effect of coil spring 66 until the finger grip comes into contact with the side of the latch body 23b. Also, as the finger grip rotates about the pin 68, the latching surface 64 will move away from the catch face 60 and eventually the safety catch portion 62 will clear the latching lug. Then further pulling on the finger grip 29b will remove the nose portion 27b of the spring latch 22b from its position of contact with the latching face 31b and will permit the tubing elevator to be opened.

Figure 6:
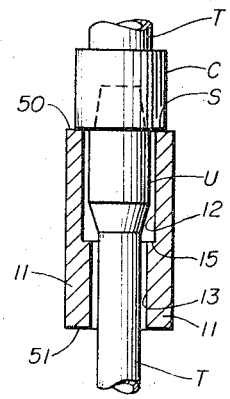
FIGURE 6 is a generally diagrammatic detail, in longitudinal section, of the elevator shown in supporting position about an externally upset pipe.

In use, the elevator, suspended by the links L from the hoisting mechanism, will be closed about a tubing string T (FIGURES 5 and 6) beneath a collar C. The lower end of the collar, which will be larger in diameter than the pipe, will form an annular shoulder S which is supported on top of end surfaces 50 of the elevator. As illustrated by way of example in FIGURE 6, the tubing is of the external upset type, having the upset portions U adjacent the end threads received in larger diameter bore portion 12, while the remainder of the pipe having the nominal standard external diameter will be received in smaller diameter bore portion 13. The upset portions are ordinarily of standard diameter and length for each nominal or standard pipe or tubing size and enlarged diameter portion 12 will be made to a diameter and length appropriate to the particular pipe, while smaller diameter portion 13 will be made to accommodate the nominal pipe diameter.

It will be obvious that the same elevator may be used for handling tubing strings in which the pipe joints do not have the external upset portions. This is accomplished merely by turning the elevator end-for-end, thereby positioning the end having the smaller bore diameter 13 upwardly and presenting end surface 51 to the lower end of the collar connecting the pipe joints or mounted on the upper end of a single pipe joint.

It will be obvious that in order to unlatch the segments of the elevator body to open them for removal from a pipe string or preparatory to placing them about a pipe string, it is only necessary to pull outwardly on handgrips 29 to thereby pull the latches outwardly over the latching lugs. To close the elevator segments about the pipe string, handles 35 are pulled toward one another causing the nose portions of the respective latches to be drawn over the surfaces 32 of the related latch lugs 30 and permit latching surfaces 28 to drop over and engage faces 31 of the respective latch lugs.

From the foregoing, it will be evident that the above-described device provides a reversible elevator fulfilling the several objects outlined above, in providing a strong, easily operated and efficient tubing elevator for handling both standard and external upset pipe and tubing.

It will be understood that various changes and modifications may be made in the details of the illustrative embodiment within the scope of the appended claims, but without departing from the spirit of the invention.

What is claimed:

1. A reversible pipe elevator comprising:
   a generally tubular body formed from complementary semi-circular segments generally symmetrical with respect to a transverse central plane, the ends of said body defining annular load-bearing surfaces;
   hinge means pivotally connecting the segments at one side for opening and closing movement relative to each other, said hinge means including laterally extending cooperating hinge members on each segment having vertically registering bores, a free floating hinge pin extending through the several bores, and means closing the outer ends of the bores in the outermost hinge members to confine the hinge pin therein, said hinge means including means biasing said segments in a normally open position;
   cooperating latch means mounted on the sides of the segments opposite the hinge means for releasably securing the segments to each other in closed position, said latch means including a pair of latches of identical construction positioned on one of the body segments and a cooperating latching lug on the other body segment, each of said latches including a latch arm pivoted on the same body segment, said arm and said lug having substantially flat mutually engaging surfaces extending radially outwardly from said body; and
   hoisting ears extending oppositely from the segments, said segments when closed defining an axial bore through the body comprising coaxial larger and smaller diameter portions opening to the opposite ends of the body whereby to accommodate pipe having external upset end portions.

2. A reversible pipe elevator comprising:
   a generally tubular body formed from complementary semi-circular segments generally symmetrical with respect to a transverse central plane, the ends of said body defining annular load-bearing surfaces;
   hinge means pivotally connecting the segments at one side for opening and closing movement relative to each other, said hinge means including laterally extending cooperating hinge members on each segment having vertically registering bores, a free floating hinge pin extending through the several bores, and means closing the outer ends of the bores, in the outermost hinge members to confine the hinge pin therein, said hinge means including means biasing said segments in a normally open position;
   cooperating latch means mounted on the sides of the segments opposite the hinge means for releasably securing the segments to each other in closed position, said latch means including a pair of latches of identical construction positioned on one of the body segments and a cooperating latching lug on the other body segment, each of said latches including a latch arm and a safety catch pivoted on the same body segment, said arm and said lug, and said catch and said lug having substantially flat mutually engaging surfaces extending radially outwardly from said body; and
   hoisting ears extending oppositely from the segments, said segments when closed defining an axial bore through the body comprising coaxial larger and smaller diameter portions opening to the opposite ends of the body whereby to accommodate pipe having external upset end portions.

References Cited by the Examiner

UNITED STATES PATENTS

| | | | |
|---|---|---|---|
| 2,067,663 | 1/1937 | Grau | 24—249 |
| 2,211,016 | 8/1940 | Krell | 294—90 |
| 2,425,753 | 8/1947 | Mullinix | 294—90 |

FOREIGN PATENTS 593,686  10/1947  Great Britain.

GERALD M. FORLENZA, *Primary Examiner.*

G. F. ABRAHAM, *Assistant Examiner.*